United States Patent
Eidmann et al.

(10) Patent No.: US 12,547,572 B2
(45) Date of Patent: Feb. 10, 2026

(54) ADAPTER FOR AN AUTOMATION FIELD DEVICE DESIGNED FOR LINKING TO HIGHWAY ADDRESSABLE REMOTE TRANSDUCER (HART) OR 4-20 MA COMMUNICATIONS LOOP CONNECTED TO FIELD DEVICE

(71) Applicant: Endress+Hauser Process Solutions AG, Reinach (CH)

(72) Inventors: Axel Eidmann, Lörrach (DE); Michael Ulrich, Reinach (CH)

(73) Assignee: Endress+Hauser Process Solutions AG, Reinach (CH)

( * ) Notice: Subject to any disclaimer, the term of this patent is extended or adjusted under 35 U.S.C. 154(b) by 6 days.

(21) Appl. No.: 18/713,238

(22) PCT Filed: Nov. 28, 2022

(86) PCT No.: PCT/EP2022/083459
§ 371 (c)(1),
(2) Date: May 24, 2024

(87) PCT Pub. No.: WO2023/104570
PCT Pub. Date: Jun. 15, 2023

(65) Prior Publication Data
US 2025/0045232 A1 Feb. 6, 2025

(30) Foreign Application Priority Data
Dec. 8, 2021 (DE) .............. 10 2021 132 315.0

(51) Int. Cl.
*G06F 13/40* (2006.01)
(52) U.S. Cl.
CPC ...... *G06F 13/4068* (2013.01); *G06F 2213/40* (2013.01)

(58) Field of Classification Search
CPC .............. G06F 13/4282; G06F 13/4068
See application file for complete search history.

(56) References Cited

U.S. PATENT DOCUMENTS

| 9,651,942 B2 * | 5/2017 | Kolblin | G06F 13/14 |
| 11,916,695 B2 * | 2/2024 | Büttner | H04L 12/40 |

(Continued)

FOREIGN PATENT DOCUMENTS

| CN | 201467170 U | 5/2010 |
| DE | 10251502 A1 | 6/2004 |

(Continued)

*Primary Examiner* — Tammara R Peyton
(74) *Attorney, Agent, or Firm* — Mark A. Logan; Endress+Hauser (USA) Holding, Inc.

(57) ABSTRACT

An adapter for an automation field device comprises a first communications interface designed for linking to a HART or 4-20 mA communications loop; a second communications interface designed for linking to a Foundation Fieldbus or Profibus PA Fieldbus based on Manchester Bus Powered transmission technology; an electronics unit with operating software that instructs the electronics unit to convert HART or 4-20 mA telegrams sent by the field device and incoming at the first communications interface into Foundation Fieldbus- or Profibus PA-compatible telegrams and to output same via the second communications interface, and/or to convert Foundation Fieldbus or Profibus PA telegrams incoming at the second communications interface into HART- or 4-20 mA-compatible telegrams and to output same via the first communications interface; and a power supply unit designed to tap electrical energy from the Foundation Fieldbus or Profibus Fieldbus via the second communications interface.

9 Claims, 1 Drawing Sheet

(56) References Cited

U.S. PATENT DOCUMENTS

2006/0192671 A1\* 8/2006 Isenmann ............ G05B 19/042
340/531
2013/0027237 A1 1/2013 Washiro

FOREIGN PATENT DOCUMENTS

| DE | 102004050079 A1 | 6/2005 |
| DE | 102015101057 A1 | 7/2016 |
| DE | 102017118585 A1 | 2/2019 |
| EP | 1854251 B1 | 11/2013 |

\* cited by examiner

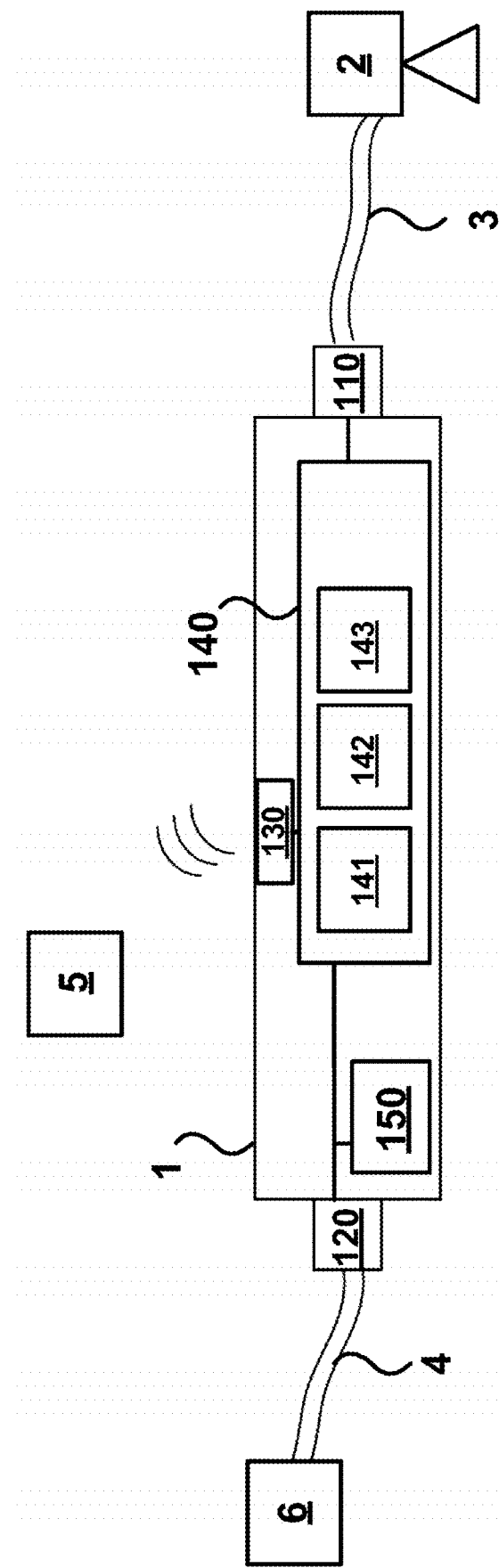

ADAPTER FOR AN AUTOMATION FIELD DEVICE DESIGNED FOR LINKING TO HIGHWAY ADDRESSABLE REMOTE TRANSDUCER (HART) OR 4-20 MA COMMUNICATIONS LOOP CONNECTED TO FIELD DEVICE

CROSS-REFERENCE TO RELATED APPLICATIONS

The present application is related to and claims the priority benefit of DPMA Patent Application No. 10 2021 132 315.0, filed on Dec. 8, 2021, and International Patent Application No. PCT/EP2022/083459, filed Nov. 28, 2022, the entire contents of which are incorporated herein by reference.

TECHNICAL FIELD

The invention relates to an adapter for an automation field device.

BACKGROUND

Field devices that are used in industrial installations are already known from the prior art. Field devices are often used in process automation engineering, as well as in manufacturing automation engineering. In principle, all devices which are process- oriented and which supply or process process-relevant information are referred to as field devices. Field devices are thus used for detecting and/or influencing process variables. Measuring devices, or sensors, are used for detecting process variables. These are used, for example, for pressure and temperature measurement, conductivity measurement, flow measurement, pH measurement, fill-level measurement, etc., and detect the corresponding process variables of pressure, temperature, conductivity, pH value, fill level, flow, etc. Actuators are used for influencing process variables. These are, for example, pumps or valves that can influence the flow of a fluid in a pipe or the fill level in a tank. In addition to the aforementioned measuring devices and actuators, field devices are also understood to include remote I/O's, radio adapters, or, generally, devices that are arranged at the field level.

A multitude of such field devices are produced and marketed by the Endress+Hauser group.

In modern industrial installations, field devices are usually connected to superordinate units via communications networks such as fieldbuses (Profibus®, Foundation® Fieldbus, Highway Addressable Remote Transducer, etc.). Usually, the superordinate units are control units, such as an SPC (storage programmable controller) or a PLC (programmable logic controller). The superordinate units are used for, among other things, process control, as well as for commissioning of the field devices. The measured values detected by the field devices, especially by sensors, are transmitted via the respective bus system to a (or possibly several) superordinate unit(s) that further process the measured values, as appropriate, and forward them to the control station of the installation. The control station serves for process visualization, process monitoring, and process control via the superordinate units. In addition, data transmission from the superordinate unit via the bus system to the field devices is also required, especially for configuration and parameterization of field devices and for controlling actuators.

For operating the field devices, corresponding operating programs (operating tools) are necessary which either run independently on the superordinate units (Endress+Hauser FieldCare, Pactware, AMS Fisher-Rosemount, PDM Siemens) or are integrated into applications of the control station (Siemens PCS7, ABB Symphony, Emerson Delta V).

In many older installations, however, the field devices frequently still communicate with the superordinate units by means of 4-20 mA technology. For this purpose, the field devices are designed as two-wire field devices and are connected to the superordinate units by means of a communications loop. The size of the process values determined by the field devices is transmitted to the superordinate units via varying current values in the range of 4 to 20 mA corresponding to the current size of the process values. Links to the Foundation Fieldbus and Profibus PA fieldbus types are not present.

Even today, the standard for field device communication is still 4-20 mA or HART. The development, registration, and approval of further communications interfaces, in particular for the Foundation Fieldbus and Profibus PA standards, is very complex and expensive for field device manufacturers. This is why not all field device manufacturers offer an option to always purchase a field device with linking to the Foundation Fieldbus and Profibus PA fieldbus types for all field device series.

SUMMARY

Proceeding from this problem, the object of the invention is to present a retrofit option for a field device for communication with a Foundation Fieldbus or Profibus PA Fieldbus.

The object is achieved by an adapter for an automation field device, wherein the adapter comprises the following components:
  a first communications interface which is designed for linking to a HART or 4-20 mA communications loop connected to the field device;
  a second communications interface which is designed for linking to a Foundation Fieldbus or Profibus PA Fieldbus based upon Manchester Bus Powered transmission technology;
  at least one electronics unit with operating software executed by the electronics unit, wherein the operating software instructs the electronics unit to convert HART or 4-20 mA telegrams sent by the field device and incoming at the first communications interface into Foundation Fieldbus- or Profibus PA-compatible telegrams and to output same via the second communications interface, and/or to convert Foundation Fieldbus or Profibus PA telegrams incoming at the second communications interface into HART- or 4-20 mA-compatible telegrams and to output same to the field device via the first communications interface; and
  a power supply unit which is designed to tap electrical energy from the Foundation Fieldbus or Profibus Fieldbus via the second communications interface and to supply the adapter with electrical energy required for its operation.

The essence of the invention is that an adapter is provided which connects a field device to a Foundation Fieldbus or Profibus PA Fieldbus. The field device itself has only one interface for linking to a HART or 4-20 mA communications loop. The adapter serves as a direct interface between the HART or 4-20 mA communications loop and the Foundation Fieldbus or Profibus PA Fieldbus, so that the HART or 4-20 mA communications loop is located on one side of the adapter or is connected to the first communications interface of the adapter, and the Foundation Fieldbus or Profibus PA Fieldbus is located on the other side of the adapter or is connected to the second communications interface of the adapter. The adapter carries out the protocol conversion between the Foundation Fieldbus or Profibus PA Fieldbus and the HART or 4-20 mA communications loop, and is supplied with electrical energy by the Foundation Fieldbus or Profibus PA Fieldbus. The Foundation Fieldbus or Profibus PA Fieldbus must be MBP (Manchester Bus Powered)-based for this purpose. Other transmission technologies that are not MBP-based are not suitable. In MBP transmission technology, data and the energy for feeding the adapter are transmitted via the same cable. Power can be limited such that use even in an environment that is exposed to explosion hazards is possible.

If the communications loop is HART-operated, communication can be designed in two ways, viz., as pure HART communication or as a combination of 4-20 mA and HART. If the adapter can draw only a small amount of electrical energy from the fieldbus, the field device is set to an address higher than 1 and communicates only via HART over the current loop. In this case, the field device requires only 4 mA. If the adapter can draw sufficient energy, the field device is set to the address 0 and is operated in the 4-20 mA+HART combination. In this case, the field device requires up to 22 mA.

The adapter can be used with all types of field devices available nowadays, which have a HART or 4-20 mA communications interface. Examples of such field devices that are mentioned in connection with the adapter according to the invention have already been described in the introductory part of the description.

According to an advantageous embodiment of the adapter according to the invention, it is provided for the adapter to a third communications interface, which is designed to wirelessly receive and send telegrams according to the Bluetooth protocol. For example, an external operating unit, in particular a mobile terminal, such as a smartphone or a tablet, a laptop or PC, or an operating device in the sense of the Field Xpert produced and sold by the applicant can thus be connected via the third communications interface.

In an advantageous embodiment of the adapter according to the invention, it is provided for the telegram converter to instruct the electronics unit to convert HART or 4-20 mA telegrams sent by the field device and incoming at the first communications interface into Bluetooth-compatible telegrams and to output same wirelessly via the third communications interface, and/or to convert Bluetooth telegrams incoming at the third communications interface into HART- or 4-20 mA-compatible telegrams and to output same to the field device via the first communications interface. The field device is thus operable via the adapter by an external operating unit, for example. It can be provided for data to be read by an operating unit, wherein an operating command is sent via Bluetooth to the third communications interface. The adapter provides for the conversion into a HART command that is sent to the field device. The response of the field device is then received by the adapter via the HART communications loop and sent to the external operating unit via the third communications interface. In this way, data can also be written to the field device—for example, parameter values. It can also be provided for the adapter to secure field device data (for example, data of the primary and secondary variables), which are transmitted by the adapter via the Foundation Fieldbus or Profibus PA Fieldbus, in the adapter in a memory, wherein the external operating unit can read said memory without the field device having to be queried again for this purpose.

An advantageous embodiment of the adapter according to the invention provides for the operating software to instruct the electronics unit to function as a master for the HART or 4-20 mA communications loop. Control units or operating units typically function as masters for the communications loop. Such masters can transmit commands to the field device, to which the field devices respond. For example, current values for process variables of the field device can be queried by the master.

A field device is usually supplied with power via the communications loop. It can furthermore be provided for the adapter to supply the field device with electrical energy required for its operation. The adapter therefore branches off some of the electrical energy tapped from the fieldbus, in order to give the electrical energy to the communications loop in accordance with the minimum and limit values specified in the 4-20 mA or HART standard via the first communications interface, and thus to supply the field device with the electrical energy.

According to an advantageous embodiment of the adapter according to the invention, it is provided for the operating software to instruct the electronics unit to read, by means of HART command "3," values of up to four process variables of the field device and/or the current value of the HART or 4-20 mA communications loop via the HART communications loop.

According to an advantageous embodiment of the adapter according to the invention, it is provided for the operating software to instruct the electronics unit to read, by means of HART command "9," values of up to eight process variables of the field device, as well as associated status information, via the HART communications loop.

According to an advantageous embodiment of the adapter according to the invention, it is provided for the operating software to instruct the electronics unit to read, by means of HART command "0," identification information from the field device via the HART communications loop. This command can be used, for example, to identify the field device when the adapter is put into operation.

Since these commands are standard commands understood by almost every field device, the adapter does not need to know the type of the field device connected to the adapter. However, it is possible to charge a special field device model in the adapter, which allows the adapter to transmit commands for specific requests to the field device.

An advantageous embodiment of the adapter according to the invention provides for the operating software to have a plurality of Foundation Fieldbus or Profibus PA functional blocks, which are designed to control communication via the Foundation Fieldbus or Profibus PA Fieldbus and to carry out conversion of the telegrams. Special knowledge about the field device is not required in this case either. It is provided, in particular, for a generic field device model to be used for the functional blocks. However, it is also possible here to use a special field device model.

The functional blocks are, for example, a resource block (containing adapter-related information and diagnostic options), a transducer block (which offers the adapter the possibility of configuring the first communications interface, e.g., in order to limit the communications loop current to 4 mA, to configure a HART address, and/or to select HART commands according to the HART version of the field device), and/or one or more AI (analog input) blocks (each representing a process variable of the field device).

According to an advantageous embodiment of the adapter according to the invention, it is provided for the adapter to have one or more further communications interfaces which are designed for linking to (a) further Foundation Fieldbus(es) or Profibus PA Fieldbus(es), wherein the operating software instructs the electronics unit to convert HART or 4-20 mA telegrams sent by the field device and incoming at the first communications interface into Foundation Fieldbus- or Profibus PA-compatible telegrams and to output same via the further communications interfaces, and/or to convert Foundation Fieldbus or Profibus PA telegrams incoming at the further communications interfaces into HART- or 4-20 mA-compatible telegrams and to output same to the field device via the first communications interface. It is thus possible to send the telegrams of the field device to several fieldbuses (selectively or simultaneously), or to receive commands from each individual fieldbus and to transmit same to the field device. Corresponding functional blocks, as described above, exist for each fieldbus.

BRIEF DESCRIPTION OF THE DRAWINGS

The present disclosure is explained in greater detail with reference to the following figure. Shown is:

FIG. 1 shows an exemplary embodiment of the adapter according to the present disclosure.

DETAILED DESCRIPTION

FIG. 1 shows a field device 2 installed in a measuring point of a process engineering installation. In the present case, the field device 2 is a fill-level measuring device which is designed to measure the fill level in a container. The field device 2 is to be connected to a modern fieldbus 4, but has only one interface for linking to a 4-20 mA or HART communications loop 3.

This is why the field device 2 is connected to the adapter 3 according to the invention. In this exemplary embodiment, the communications loop 3, which in the present case is a HART communications loop, is connected to a first communications interface 110 of the adapter 1. It can be provided for the adapter to be designed so as to be physically connected to the field device 2. For example, the adapter 1 is screwed into the PG terminal of the field device 2 by thread.

A fieldbus—in the present example a Foundation Fieldbus 4 (i.e., a fieldbus designed in accordance with the Foundation Fieldbus specification)—is connected to the second communications interface 120 of the adapter. The Foundation Fieldbus 4 is based upon Manchester Bus Powered (MBP) transmission technology. This means that the fieldbus on OSI layer 1 is composed of two lines via which data/telegrams and electrical energy are transmitted in equal measure.

The adapter has a power supply unit 150, which is designed to detect electrical energy transmitted via the Foundation Fieldbus 4 and to supply the adapter 1 with electrical energy required for its operation. The adapter 1 is, moreover, designed to transmit electrical energy to the HART communications loop 3 and to the field device 2 in order to be able to carry out the measuring operation of the field device 2.

The mode of operation and further components of the adapter 1 are described using a short functional example: One or more control units (for example, SPS's) are connected to the Foundation Fieldbus 4. They are to detect the primary variable of the field device 2 at regular intervals. For this purpose, in the context of cyclical communication, the control unit sends an operating telegram towards the field device 2. In this process, however, the control unit is not informed about the field device 2, but, rather, about the adapter 1, which means that the operating telegram is transmitted to the fieldbus address of the adapter 1. The operating telegram is received by the second communications interface 120.

The adapter comprises an electronics unit 140 with operating software executed thereon, in particular firmware that controls the adapter or executes its operating functionalities. The electronics unit processes the request of the operating telegram and converts the request into a HART telegram, based upon the content of the operating telegram. In the present case, the adapter creates a control telegram containing the HART operating command "3" and transmits same via the HART communications loop 3. Said HART operating command instructs the field device to detect a current measured value of one or more of its primary variables. After detection, the field device transmits the measured value or values as content of a new HART telegram via the HART communications loop 3 to the adapter 1.

The adapter 1 receives the HART telegram sent by the field device, analyzes same, and converts same into a Foundation Fieldbus-compatible telegram. For this purpose, the measured value of the process variable is extracted from the HART telegram and stored in an AI functional block 141 in the adapter. Using this functional block, the electronics unit 140 creates the Foundation Fieldbus-compatible telegram, which is transmitted to the control unit via the Foundation Fieldbus 4.

A generic field device model implemented in the operating software is used for converting Foundation Fieldbus-compatible telegrams into HART-compatible telegrams, and vice versa. The standard functionalities of the field device 2 are thus covered—for example, the described retrieval of measured values of the primary variables. The generic field device model allows for a simple mapping of Foundation Fieldbus commands into HART commands, and vice versa. As a result, the adapter 1 can be operated with virtually any type of field device, without the adapter 1 having to be specially configured. However, it is also possible to load a special field device model onto the adapter 1, which allows for the mapping of special or complex commands.

The adapter 1 has further functional blocks in addition to the AI functional block 141—for example, a transducer block 142 and a resource block 143. The transducer block 142 allows the adapter to configure the first communications interface, e.g., in order to limit the communications loop current to 4 mA, to configure a HART address, and/or to select HART commands according to the HART version of the field device. The resource block 143 includes adapter-related information and diagnostic options.

The adapter 1 furthermore has a third communications interface 130, which is designed for wireless communication and allows for wireless operation of the field device 2 by means of an external operating unit 5 via Bluetooth. The external operating unit 5 is, in particular, a mobile terminal, such as a smartphone or a tablet, a laptop or PC, or an operating device in the sense of the Field Xpert produced and sold by the applicant.

The operating commands sent by the external operating unit 5 are converted into a HART telegram by the electronics unit 140, in particular using the generic field device model. The field device 3 is then queried by the adapter in a manner analogous to what has been described above, and transmits its response. The HART telegram of the field device 3 is then converted into a Bluetooth format by the electronics unit 140 and is transmitted to the external operating unit 5.

A plurality of different operations of the field device 3 can be performed by means of the control unit (via the Foundation Fieldbus 4) and/or by means of the external operating unit 5. In addition to the described measured value query of the primary variables, the term "operate" also includes writing parameter values to the field device 3, retrieving diagnostic information of the field device 3, retrieving identification information of the field device 3, or the like.

It should be appreciated that the method according to the invention and the system according to the invention can be applied to any type and number of field devices 2, and are not limited to the exemplary embodiment shown in FIG. 1. Furthermore, instead of using a Foundation Fieldbus, it is also possible to use a Profibus PA Fieldbus, the properties of which are very similar.

The invention claimed is:

1. An adapter for an automation field device, comprising:
   a first communications interface which is designed for linking to a Highway Addressable Remote Transducer (HART) or 4-20 milliamp (mA) communications loop connected to the automation field device;
   a second communications interface which is designed for linking to a Foundation Fieldbus or Profibus PA Fieldbus based upon Manchester Bus Powered transmission technology;
   an electronics unit with operating software executed by the electronics unit, wherein the operating software instructs the electronics unit to convert HART or 4-20 mA telegrams sent by the field device and incoming at the first communications interface into Foundation Fieldbus- or Profibus PA-compatible telegrams and to output the Foundation Fieldbus- or Profibus PA-compatible telegrams via the second communications interface, and/or to convert Foundation Fieldbus or Profibus PA telegrams incoming at the second communications interface into the HART- or 4-20 mA-compatible telegrams and to output the HART- or 4-20 mA-compatible telegrams to the automation field device via the first communications interface; and
   a power supply unit which is designed to tap electrical energy from the Foundation Fieldbus or Profibus Fieldbus via the second communications interface and to supply the adapter with electrical energy required for its operation and further to supply electrical energy via the first communications interface to the HART communication loop and to the automaton field device.

2. The adapter according to claim 1, further comprising:
   a third communications interface which is designed to wirelessly receive and send telegrams according to a Bluetooth protocol.

3. The adapter according to claim 2, wherein the operating software instructs the electronics unit to convert the HART or 4-20 mA telegrams sent by the field device and incoming at the first communications interface into Bluetooth-compatible telegrams and to output the Bluetooth-compatible telegrams wirelessly via the third communications interface, and/or to convert the Bluetooth telegrams incoming at the third communications interface into the HART- or 4-20 mA-compatible telegrams and to output the HART- or 4-20 mA-compatible telegrams to the field device via the first communications interface.

4. The adapter according to claim 1, wherein the operating software instructs the electronics unit to function as a master for the HART or 4-20 mA communications loop.

5. The adapter according to claim 4, wherein the operating software instructs the electronics unit to read, via HART command "3," values of up to four process variables of the automation field device and/or a current value of the HART or 4-20 mA communications loop via the HART communications loop.

6. The adapter according to claim 5, wherein the operating software instructs the electronics unit to read, via HART command "9," values of up to eight process variables of the field device, as well as associated status information, via the HART communications loop.

7. The adapter according to claim 6, wherein the operating software instructs the electronics unit to read, via HART command "0," identification information from the field device via the HART communications loop.

8. The adapter according to claim 1, wherein the operating software has a plurality of Foundation Fieldbus or Profibus PA functional blocks which are designed to control communication via the Foundation Fieldbus or Profibus PA Fieldbus and to carry out conversion of the telegrams.

9. The adapter according to claim 1, wherein the adapter includes one or more further communications interfaces which are designed for linking to (a) further Foundation Fieldbus(es) or Profibus PA Fieldbus(es), wherein the operating software instructs the electronics unit to convert the HART or 4-20 mA telegrams sent by the field device and incoming at the first communications interface into the Foundation Fieldbus- or Profibus PA-compatible telegrams and to output the Foundation Fieldbus- or Profibus PA-compatible telegrams via the further communications interfaces, and/or to convert the Foundation Fieldbus or Profibus PA telegrams incoming at the further communications interfaces into the HART- or 4-20 mA-compatible telegrams and to output the HART- or 4-20 mA-compatible telegrams to the field device via the first communications interface.

\* \* \* \* \*